(No Model.) 7 Sheets—Sheet 2.

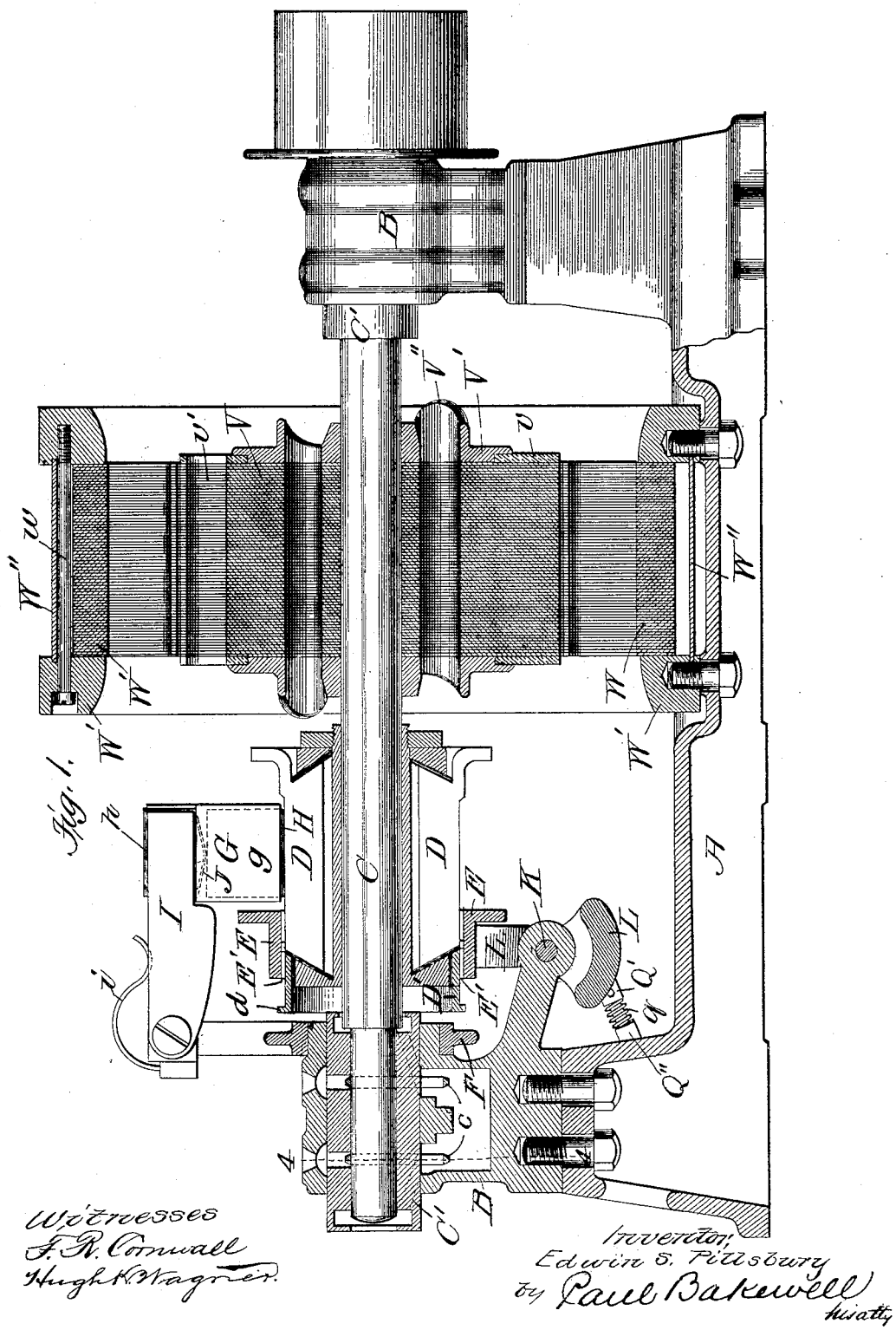

E. S. PILLSBURY.
ELECTRIC MOTOR.

No. 583,933. Patented June 8, 1897.

Witnesses:
F. R. Cornwall
Hugh K. Wagner

Inventor
Edwin S. Pillsbury
by
Paul Bakewell
his atty.

(No Model.)   7 Sheets—Sheet 3.
E. S. PILLSBURY.
ELECTRIC MOTOR.
No. 583,933. Patented June 8, 1897.
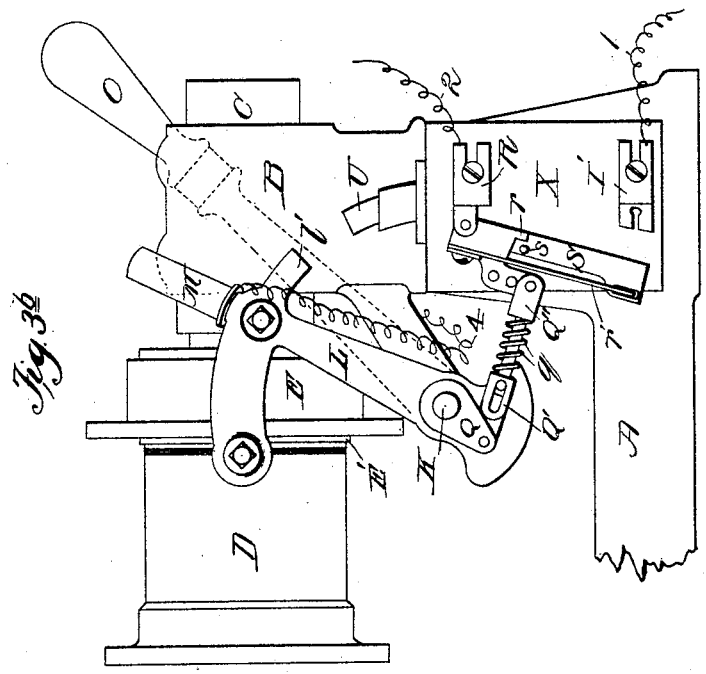
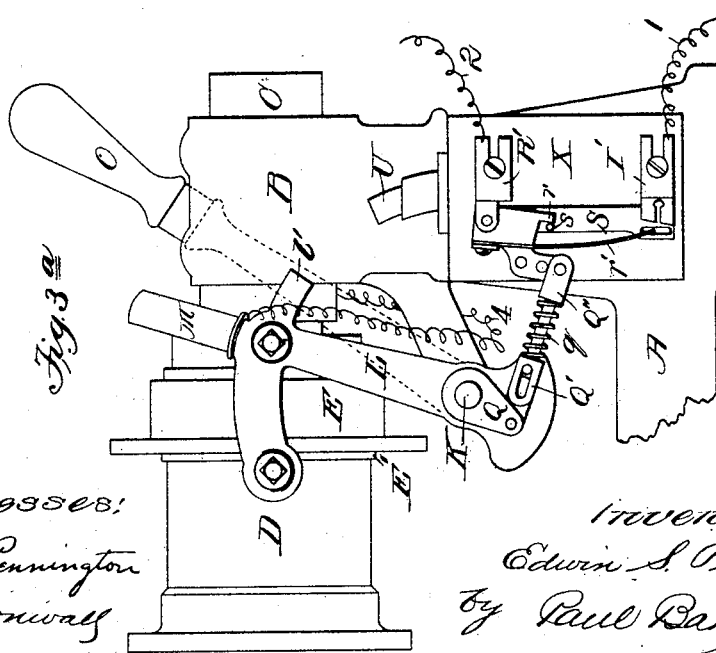
Witnesses:
G. A. Pennington
F. R. Cornwall
Inventor:
Edwin S. Pillsbury
by Paul Bakewell
his atty.

(No Model.)  E. S. PILLSBURY.  7 Sheets—Sheet 4.
ELECTRIC MOTOR.
No. 583,933. Patented June 8, 1897.
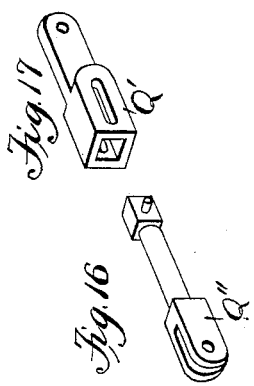
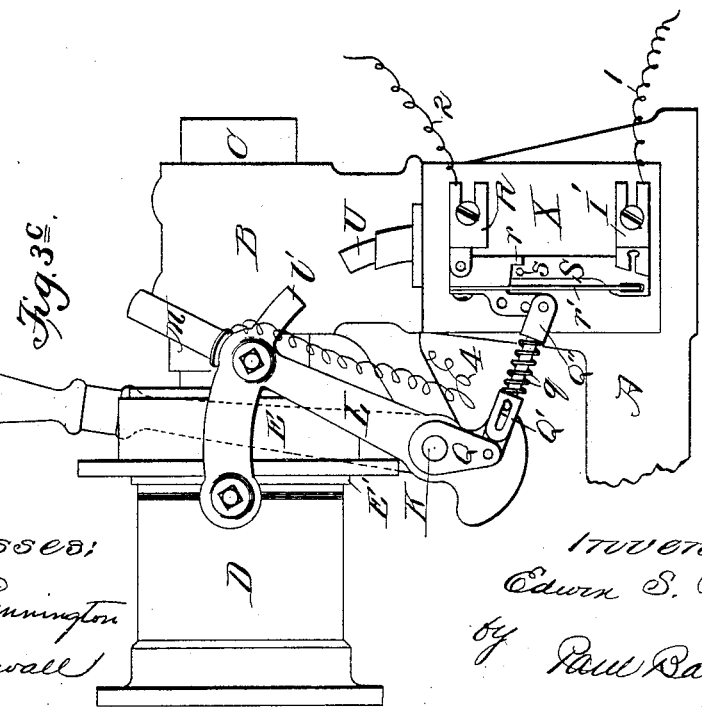

(No Model.)　　　　　　　　　　　　　　　　7 Sheets—Sheet 5.
E. S. PILLSBURY.
ELECTRIC MOTOR.
No. 583,933.　　　　　　　　　　　Patented June 8, 1897.
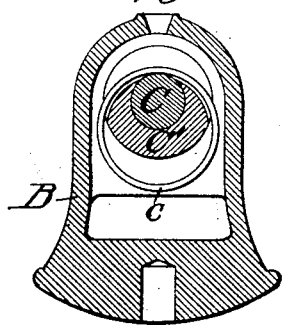
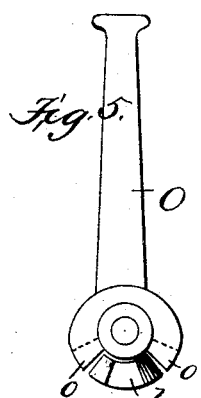
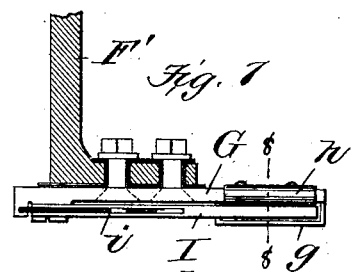
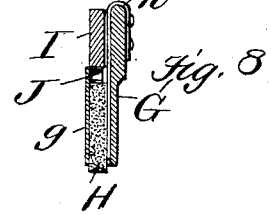
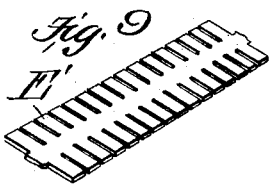
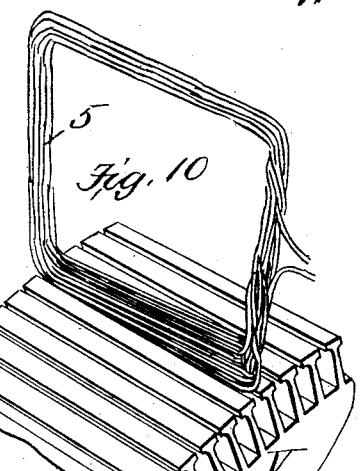
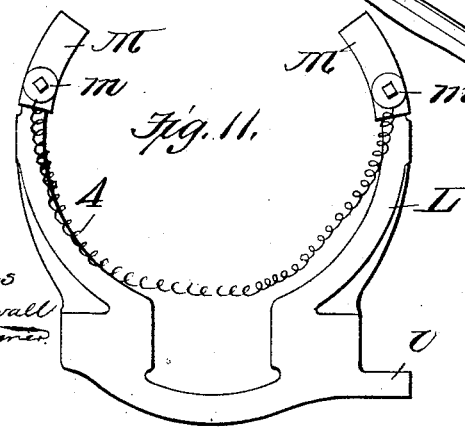
Witnesses
F. R. Cornwall
Hugh K. Wagner
Inventor
Edwin S. Pillsbury
by Paul Bakewell
his atty.
THE NORRIS PETERS CO., PHOTO-LITHO., WASHINGTON, D. C.

(No Model.) 7 Sheets—Sheet 6.
E. S. PILLSBURY.
ELECTRIC MOTOR.

No. 583,933. Patented June 8, 1897.

Witnesses:
F. R. Cornwall.
Hugh K. Wagner.

Inventor
Edwin S. Pillsbury
by Paul Bakewell
his atty.

THE NORRIS PETERS CO., PHOTO-LITHO., WASHINGTON, D. C.

(No Model.) 7 Sheets—Sheet 7.

E. S. PILLSBURY.
ELECTRIC MOTOR.

No. 583,933. Patented June 8, 1897.

Witnesses:
G. A. Pennington
F. R. Cornwall

Inventor:
Edwin S. Pillsbury
by Paul Bakewell
his atty.

THE NORRIS PETERS CO., PHOTO-LITHO., WASHINGTON, D. C.

UNITED STATES PATENT OFFICE.

EDWIN S. PILLSBURY, OF ST. LOUIS, MISSOURI, ASSIGNOR TO THE EMERSON ELECTRIC MANUFACTURING COMPANY, OF MISSOURI.

ELECTRIC MOTOR.

SPECIFICATION forming part of Letters Patent No. 583,933, dated June 8, 1897.

Application filed November 16, 1895. Serial No. 569,143. (No model.)

*To all whom it may concern:*

Be it known that I, EDWIN S. PILLSBURY, a citizen of the United States, residing at the city of St. Louis, State of Missouri, have invented a certain new and useful Improvement in Electric Motors, of which the following is a full, clear, and exact description, reference being had to the accompanying drawings, wherein—

Figure 3:
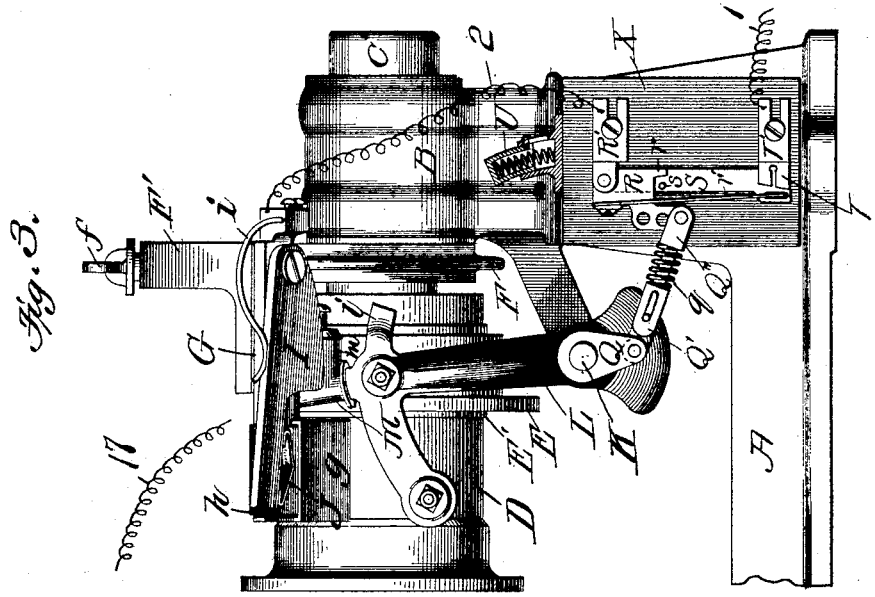
Figure 2:
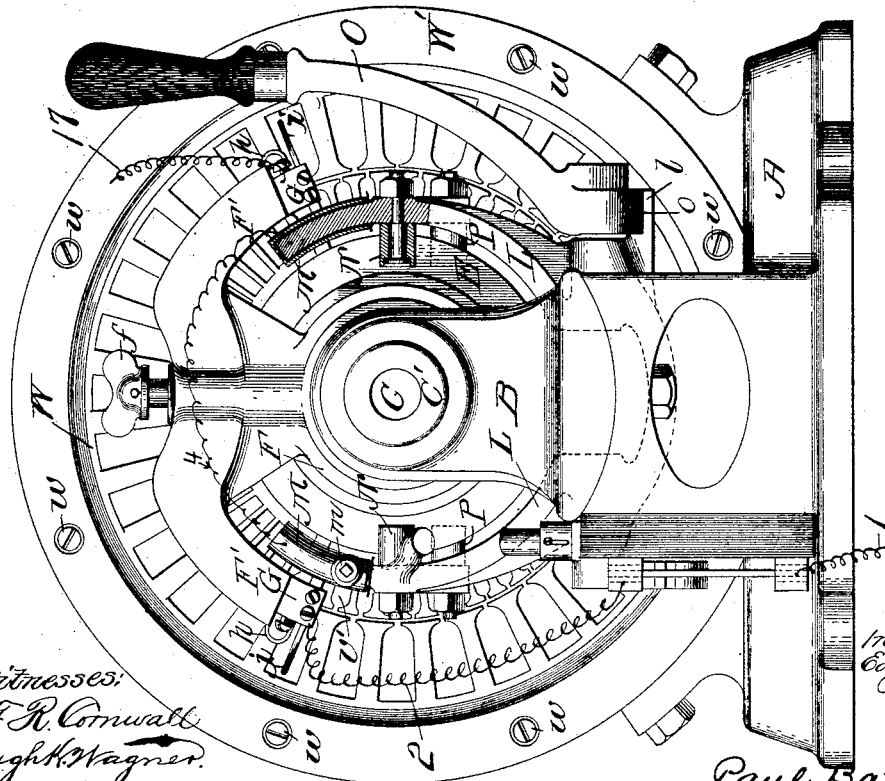
Figure 12:
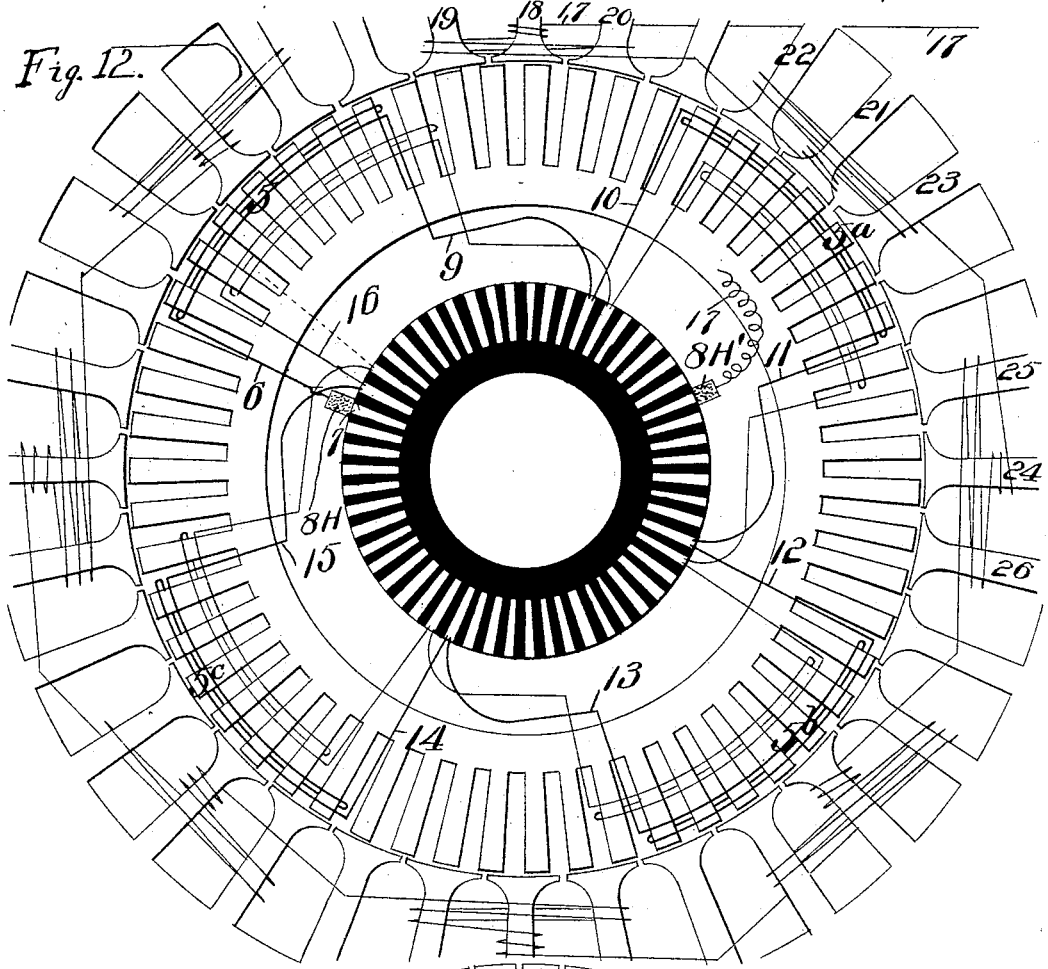
Figure 13:
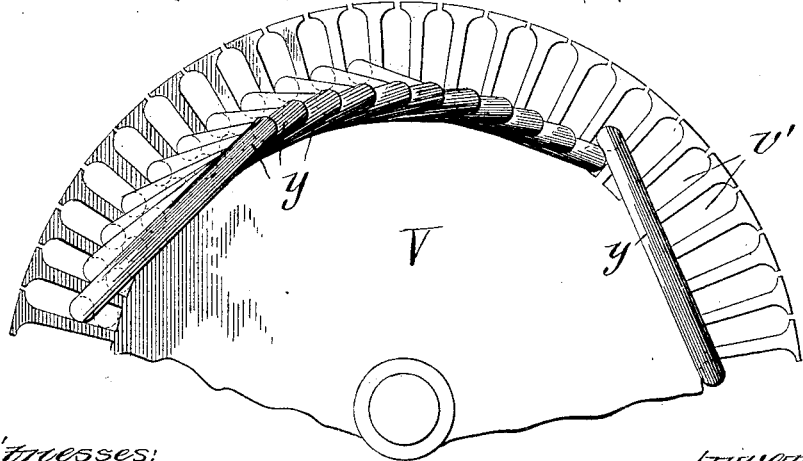
Figure 14:
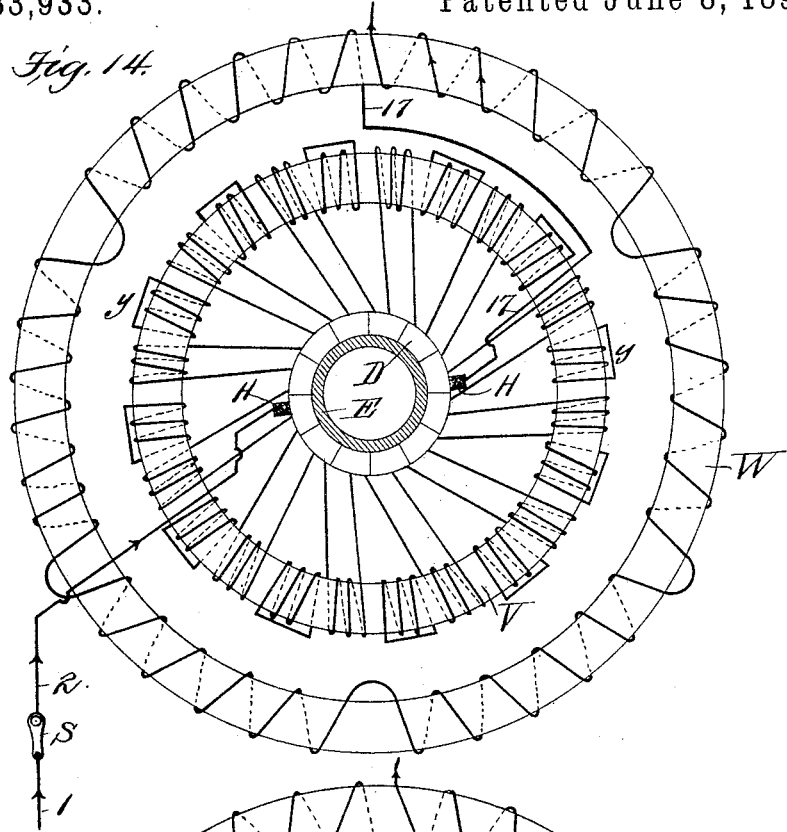
Figure 15:
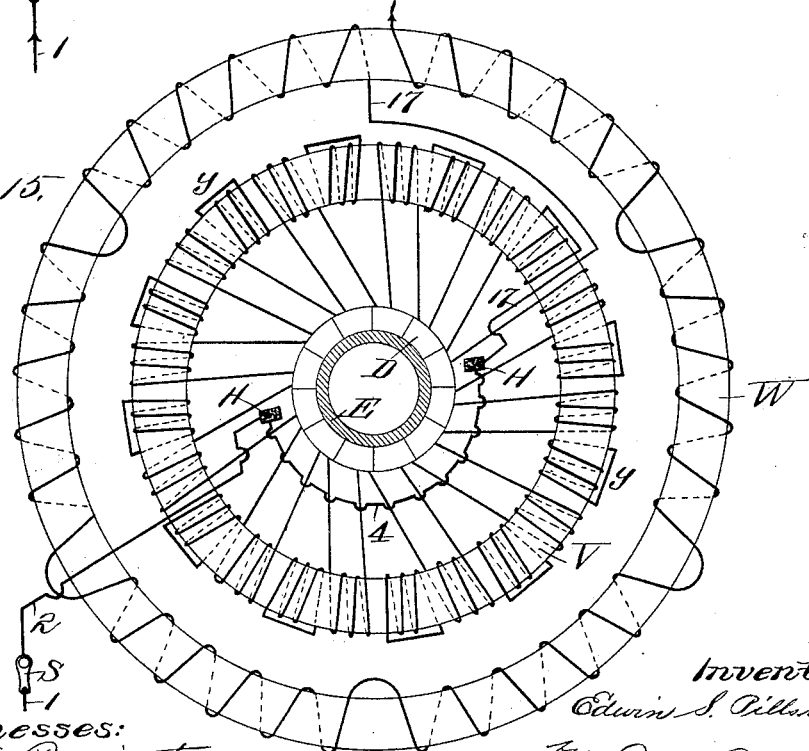

Figure 1 is a longitudinal sectional view through my improved motor. Fig. 2 is a front elevational view of the same. Fig. 3 is a side elevational view of the commutator and its associate parts. Fig. 3ª is a similar view showing the handle in position to throw the switch and move the short-circuiting ring on the commutator, the brushes and their holders being omittted. Fig. 3ᵇ is a view similar to Fig. 3ª, showing the position of the parts just after the switch is opened and the short-circuiting ring thrown out of contact with the commutator-segments, whereby current is shut off from the motor. Fig. 3ᶜ is a view similar to the above, showing the position of the handle when the motor is first started as a series motor, the parts being in position to short-circuit the commutator and raise the brushes upon a further movement of the handle, such further and final movement being shown in Fig. 3, in which the commutator is short-circuited and the brushes raised, whereby the motor runs as an induction-motor. Fig. 4 is a cross-sectional view through one of the shaft-bearings and its oil-well, taken on line 4 4, Fig. 1. Fig. 5 is a detail view of the yoke-operating handle. Fig. 6 is a bottom plan view of the same. Fig. 7 is a top plan view of the brush-holder. Fig. 8 is a sectional view through the same on line 8 8, Fig. 7. Fig. 9 is a detail view of a portion of the sliding short-circuiting band on the commutator. Fig. 10 is a detail illustrating the manner of inserting the coils in the armature-grooves. Fig. 11 is a detail view of the yoke which operates the commutator-brushes. Fig. 12 is a schematic view of the windings of the armature and field, showing the commuted circuits when the commutator is open. Fig. 13 is a similar view showing the closed circuit-windings of the armature. Fig. 14 is a schematic view showing a conventional form of winding for the field-magnet and armature and indicating the course of the current when the motor is running as a series motor. Fig. 15 is a similar view in which the armature has been short-circuited and the brushes electrically connected, whereby the motor runs as an induction-motor. Figs. 16 and 17 are detail views of the switch-blade-operating mechanism. Fig. 18 is a detail view showing at the left the manner of winding a coil with strips of paper between the layers and at the right the coil after the strips have been removed, both views being cross-sections of a coil.

This invention relates to a new and useful improvement in electric motors, the object being to construct a motor to be run by alternating currents and develop great power with a high degree of efficiency.

With these objects in view the invention consists, first, in arranging an open winding on the armature, by which speed is primarily attained, and in combining with said open winding a closed winding, which assists in attaining said high speed by induction and prevents the motor from running away; second, in combining with said windings means for short-circuiting the open windings, whereby the motor is converted into an induction-motor; third, in providing means whereby upon the manipulation of a single lever the commutator, open windings of the armature, and field are first cut in, and upon a continuation of the movement of said lever the commutator-brushes are electrically connected and the open windings of the commutator are closed or short-circuited; fourth, in combining a progressively-wound armature and a closed winding on the armature with a series-wound field and in providing means for short-circuiting the progressive windings on the armature, and, finally, the invention consists in the construction, arrangement, and combination of the several parts, all as will hereinafter be described and afterward pointed out in the claims.

In the drawings, A indicates the base of the machine, from the ends of which rise suitable pedestals for supporting boxes B. By preference these pedestals are concaved on their faces on a curved line described from the axis of the shaft, and the boxes are received on these faces. The bolts for securing the boxes in place are introduced from the under side of the pedestals through openings of larger diameter than the bolts and into the boxes. By this arrangement the boxes are easily trued and are not liable to get out of alinement.

C indicates the shaft, which is mounted in suitable bearings C', introduced through boxes B. Suitable means are provided for lubricating the shaft in the bearing, said means being shown in the drawings (see Figs. 1 and 4) as consisting of a ring $c$, suspended from the shaft and rolled thereby, said ring conveying oil from a well in box B to the shaft-bearing.

D indicates a commutator of any ordinary or approved construction, which is mounted on shaft C, said commutator having an insulated extension D, preferably flush with the face of the commutator-segments and provided with an external flange $d$ on its front end.

Slidingly mounted on the commutator is a short-circuiting ring E, which is provided with an external flange, as shown. This ring embraces a slitted band E', which is adapted to slide onto and off from the commutator-segments when the ring is actuated. When the commutator-windings are open, this ring and its embraced band rest on the insulated extension D' of the commutator and do not contact with the commutator-segments. When the ring and its band are slid on the commutator, as shown in Fig. 1, the segments thereof are short-circuited.

F indicates a brush-ring mounted upon some suitable part of the machine concentric with the shaft, said ring being made adjustable by a binding-screw $f$. Extending from this ring are lateral arms F', upon the ends of which are mounted and properly insulated therefrom brush-holders G. These brush-holders consist of an attaching-plate, from the rear ends of which project inwardly suitable boxes $g$ for the brushes H, which brushes are held against one side of the box by a spring $h$ for the purpose of preventing rattling and affording a firm bearing on the commutator.

Pivotally mounted at the front end of the brush-holder plates are brush spring-holders I, the rear ends of which are provided with springs J, adapted to yieldingly press the brushes against the commutator. A spring $i$, mounted on the brush-holder plate, bears against the outer edge of this brush spring-holder and forces the free end of the same, or the spring on its end, against the brush. The inner edges of these brush spring-holders are formed with cam-faces, which are engaged by the ends of a yoke which forces them and their springs J outwardly, relieving the brushes of their pressure and permitting them to ride freely over the commutator without making actual contact.

Mounted in suitable bearings and preferably beneath the commutator is a shaft K, upon which is loosely mounted a yoke L, whose arms embrace or partly surround the commutator. The upper ends of the members of this yoke are provided with insulated pieces M in the form of caps, which are preferably provided with binding-posts $m$, by which they are electrically connected by a wire 4. By this arrangement when the yoke is swung to the rear to raise the pressure from the brushes by forcing the brush spring-holders outwardly, which is accomplished by the caps M contacting with the cam-faces thereof, the brushes are short-circuited by the wire 4, which connects the caps M. Coincidently with this a roller N on the yoke contacts with the flange of ring E and forces the same and its short-circuiting band E' inwardly over the commutator-segments, which are thereby short-circuited. To rock this yoke, I provide a handle O, which is fixed to the end of shaft K, the hub of said handle having lateral projections $o$, forming a groove or seat between them, in which fits a projection $l$ on the yoke. The object of this is to lose movement between the initial operation of the handle and its final movement, which operates the yoke. The yoke is also formed with rearwardly-extending projections, in the ends of which are mounted rollers P, whose function is to force the ring E forwardly when the yoke is moved in that direction, the space between the two rollers, however, permitting the ring to remain stationary during the initial movement of the yoke to the front.

Mounted on shaft K is an arm Q, preferably composed of some insulating material, in the end of which is mounted a hollow slotted section Q', which receives the male section Q'' of a switch-operating mechanism. Between these two sections is a spring $q$, whose function is to exert a constant tendency to keep them extended, the slot-and-pin connection between the sections limiting their telescoping movement. The other end of section Q'' is connected to the switch-blade operator R, which is pivoted to a block R', adjustably secured to an insulation-block X, mounted on the framing A. This operator R is provided with an extension $r$, which is adapted to contact with a pin $s$ on the switch-blade S when the arm Q is moved to the rear and force the blade out of the prongs T on a block T'. A hair-pin-like spring $r'$, mounted on the piece R and passing through a slot in the end of the switch-blade, snaps the blade out of the prongs and makes a quick break.

The inlead-wire 1 is connected to the block T' and from there is conducted to block R' by the switch-blade when the parts are in the position shown in Fig. 3. From block R' the current is conducted to one of the brushes by wire 2 and progressively around the armature if the short-circuiting band is not in contact with the commutator-segments and from the other brush to and around the field by wire 17, whence it is led off, as shown in Fig. 14. In the event of ring E short-circuiting the commutator-segments, as shown in Fig. 15, the current passes from block T' to block R', thence to one of the brushes through wire 2. The brushes being short-circuited by wire 4, connecting the caps M, (see Fig. 11,) the current passes to the "take-off" brush and goes to the field through the same wire which was used when the current passed through the armature.

The operation of the means whereby the above is accomplished is as follows: Assuming the handle to be forward and the roller P near the rear face of ring E, as shown in Fig. 3$^b$, the first movement of the handle to the rear will throw the switch-blade into operative position, the same being spring-pressed by spring $q$. This position is shown in Fig. 3$^c$. The motor will now start as a series motor, the brushes commuting the current to the armature. This condition is permitted to exist for some little time until the motor has attained a high speed. The backward movement of the handle is now continued, the slot in section Q' of the switch-operating mechanism permitting this until the rollers N contact with ring E, when said ring and its short-circuiting band E' will be forced into contact with the greater number of commutator-segments. The brushes now become useless, and to relieve them of wear the pressure upon them is withdrawn by the caps M, which contact with the cam-faces of the brush spring-holders, raising their carried springs out of the brush-boxes. When this is done, the handle will have reached its rearmost position, and the motor will now run as an induction-motor. This position is shown in Fig. 3. I might add that the band E' is intended to contact with all of the commutator-segments, but it is of no consequence if some of the segments are missed, as the winding of the armature is such that missing contact with a few commutator-segments would not affect the short-circuiting at all. A movement in the opposite direction of the handle, as in stopping the motor, will accomplish this. The handle will first move to such a position that its forward projection $o$ will contact with the projection $l$ of the yoke, which extends between said projections. By this time the cross-pin on member Q'' will have traveled the length of the slot in the member Q' of the switch-operating mechanism and be in readiness to swing the piece R and force the hair-pin spring $r$ to exert a tension to snap the switch, as shown in in Fig. 3$^a$. This is soon done, as the handle is continued to be moved forward, and about the same time the rollers P strike the ring E and force it forwardly off of the commutator-segments, as shown in Fig. 3$^b$. It might happen that this forward movement of the handle would be done quickly, and when the entire movement had taken place and the handle released the rollers P would be left against ring E. To obviate this, I arrange a spring-buffer U on top of the insulation-block, with which is adapted to abut a projection $l'$ on the yoke. When the handle is brought forward, if the movement is with such force as to throw the projection $l'$ against the buffer, when the handle is released, the buffer will force the yoke somewhat to the rear, at least a sufficient distance to relieve the ring E from bearing against rollers P.

I will now describe the armature and its windings.

Referring to Fig. 1 it will be seen that the armature V consists, essentially, of a core of laminated material, which is clamped on the shaft D by two end plates V', which are formed with end wings V'', whose function is to create a circulation of air through the openings in the armature for the purpose of keeping it cool. These end plates also hold in position insulation-rings $v$ at the sides and near the periphery of the armature, whose office is to prevent the windings from chafing and grounding on the laminations of the core. The periphery or face of the armature is formed with transverse grooves $v'$, whose mouths are contracted, as shown in Figs. 2 and 10. The object of this is to get as much surface area as possible and prevent humming. The windings of the armature are the closed windings and the commutator-windings. The closed windings consist of heavy strands $y$, which are threaded through the recesses, skipping a certain number of polar extensions, and back to the starting-point, where the ends are connected. These windings, as seen by reference to Fig. 13, progress around the armature, building up a closed winding, which is evenly distributed around the entire periphery. The armature illustrated has fifty-five polar extensions, and as the field is arranged as an eight-pole field these closed windings must conform as nearly as possible to the poles of the field. For instance, the field-core illustrated is formed with thirty-two polar projections, and being wound as an eight-pole field it will necessarily follow that four of these polar extensions go to make up a field-pole, which field-pole extends over one-eighth of the entire field-surface. Therefore the windings of the armature, not having a common multiple of the field, are arranged as nearly as possible to conform to the field polar surface or one-eighth of its periphery, and this arrangement necessitates the inclusion of seven armature polar projections within the limits of the closed windings, or fifty-six polar projections for eight complete windings. This brings the last winding one space beyond the starting-point and the last winding including the first polar projection. This winding, however, is carried on step by step—that is, the first winding is placed in spaces Nos. 1 and 8 and includes the first seven polar projections, the second winding is placed in spaces Nos. 2 and 9 and includes the second seven polar projections, and so on around, the last winding including the first six polar projections.

The commutator-windings 5 of the armature are first wound on a form with a strip of paper $x$ between the layers, as shown at the left, Fig. 18, said form being of the dimensions of seven polar projections. When these windings are complete, the paper is removed, as shown at the right, Fig. 18, and the windings are inserted in the spaces through their contracted openings, as shown in Fig. 10, one strand at a time, which is permissible by reason of the space left between the strands by the removal of the paper. By this manner of winding the armature it will be seen that the bulk of the strands are forced behind the shoulders which contract the openings to the spaces, and these resist the centrifugal force which tends to dislodge the windings, and, if desirable, strips of insulation may be used to plug up these spaces after the coils are in position. The ends of these windings are connected to the commutator-segments in a manner which will now be described. Assuming that the end 6 of one of the windings is connected to the commutator-segment 7, with which, we will say, the brush 8H is in contact, the other end of this winding is carried around and connected to the commutator-segment fourteen segments removed, or a little more than one-quarter around the periphery of the commutator. This segment has extending from it wire 10, which is one end of a coil $5^a$, which coil includes the third seven polar projections from the starting-point of wire 6. The other end of this coil $5^a$ is connected by wire 11 to a commutator-segment fourteen spaces removed from the connection of its wire 10. This last-named commutator-segment has extending from it a wire 12, forming one end of a coil $5^b$, whose other end is connected to a commutator-segment by wire 13, fourteen spaces removed from the connection of its wire 12 to the commutator. Extending from the segment to which leads wire 13 is a wire 14, leading to a coil $5^c$, whose other end is connected by wire 15 to a commutator-segment fourteen spaces removed from the connection of its wire 14 with the commutator or to the first segment in advance of the one with which the brush $8^H$ is in contact. From this segment a wire 16 leads, similar to wire 6, to a coil located one pole in advance of coil 5, and these coils and connections are repeated around the armature, each complete circuit advancing one pole or segment until the take-off brush $8^{H'}$ is finally reached. From this point the current is conducted by a suitable wire 17 to the field, where the coils are shown as being in series.

It will be noted that, due to the number of polar projections on the armature, the number of such projections which are included in a single coil and the distance of these coils (of the same series) apart, one complete circuit around the armature advances the winding one commutator-segment or one polar projection ahead of the starting-point, making the winding a progressive one. It will be obvious that this manner of winding could be changed somewhat, and instead of the last coil of what I will term a "complete" series advancing one segment or projection ahead of the starting-point the total number of polar projections on the armature or the number of such projections which are included in a single coil or the distance of these coils (of the same series) apart could be modified, so that the last coil of a complete series would end one segment or projection behind the starting-point, making the winding a retrogressive one mechanically, but not changing its electrical influence. It will be noted that this winding, whether mechanically progressive or retrogressive, is alive throughout its entire length at all times, as the brushes are wide enough to make contact with the advance segment before it leaves the other behind. Of course, when the windings are short-circuited it will be understood that the brushes are useless and that these windings would not be alive, in the sense that a primary current would be passing through them, but they would be alive and active in the sense of being induced-current conductors or secondary-current conductors.

The field-winding is such that the intensity of the magnetic lines of force vary in the different poles—that is, the lines of force are most intense in the middle of the pole, while at each side they are but half as strong, and at the ends they are *nil*. This is accomplished by the peculiar manner in which the field is wound and which I will now describe. Assuming that the current comes through wire 17, which is equivalent to wire 3, from brush $8^{H'}$ or from wire 4, if the commutator is short-circuited, it first passes through a coil wound around a single polar extension— say 18. From there it passes through a coil wound around the two next adjacent polar extensions 19 and 20, between which is located the polar extension 18. From this coil it passes through a wire which skips two polar extensions and is wound around the third single polar extension 21 and through a coil wound around the two next adjacent polar extensions 22 and 23, between which is located the polar extension 21. These two last-mentioned coils are wound in an opposite direction from those first mentioned, so as to establish an opposite pole from that established in the poles 18, 19, and 20. From the coil last mentioned the current passes through a wire which skips two polar extensions and is wound around the third single polar extension 24 in the same direction that polar extension 18 is wound. From this coil it passes through a coil which extends over three polar extensions 25 24 and 26, 24 being in the middle, said last-named coil being wound in the same direction as the coil on polar extension 24 and polar extension 18 and 19, 18 and 20.

This manner of winding is continued around the field, every other pole being of the same polarity, the remaining being of opposite polarity. By this arrangement the magnetic intensity of the poles 18 21 24, &c., is twice as great as that of poles 19 20, 22 23, 25 26, &c., the polar extensions between 20 and 22, 23 and 25, &c., being always at zero. Thus a scale of two poles would be, starting from zero, $+2, +4, +2, 0, -2, -4, -2, 0$, meaning that the first polar extension ($+2$) would have a magnetic intensity due to the winding of two coils around it one-half as great as the second polar extension. The second ($+4$) would have a magnetic intensity due to the winding of four coils around it twice as great as the first polar extension; the third, ($+2$,) the same as the first. The fourth (0) has generated around it no magnetic lines of force and would be at zero; the fifth, ($-2$,) the same as the first, except that the polarity would be south instead of north; the sixth, ($-4$,) the same as the second, except that the polarity would be south instead of north, and the seventh the same as the fifth. The eighth would be zero.

A field-magnet wound as above described—that is, the coils being arranged on groups of three polar projections, the coils of every other group being wound in opposite directions and in such manner that the magnetic intensity of each pole, beginning at zero, increases gradually until it reaches the maximum at the center of the pole—embodies the best form of field-magnet winding for this type of motor, as has been found by actual experiments. The magnetism of the poles is intense at the proper point, so that little or no waste occurs, and the armature runs more easily and smoothly than where it enters and leaves a magnetic field which commences and ends abruptly.

It might be well to say in this connection that the field-core W, from which project the polar extensions around which the above-mentioned coils are wound, is laminated and clamped between two rings W', mounted on the framing A, said rings clamping an inclosing band W'' between them, the whole being secured in position by bolts or screws $w$. This laminated field-core is formed with transverse grooves with contracted openings similar to the armature-core, and the field-coils are preferably formed and introduced similar to the manner of forming and introducing the commutator-windings heretofore described. I have shown this field as having thirty-two polar extensions; but it is obvious that this number could be changed and a greater or a less number be employed, as desired. It is also obvious that a greater or a less number of polar extensions could be employed on the armature, as the particular number shown and described is immaterial to the operation of the motor, or a Gramme ring or a Siemens drum-armature could be used. Again, instead of winding the field in the particular manner shown other forms of winding could as readily be employed with good results.

I am aware that many minor changes in the construction, arrangement, and combination of the several parts of my invention may be made and substituted for those herein shown and described without in the least departing from the nature and principle of my invention.

Having thus described my invention, what I claim, and desire to secure by Letters Patent, is—

1. In a motor, the combination with the field-magnets of a progressively-wound armature, a commutator therefor, a closed winding on the armature, means for short-circuiting the progressive windings of the commutator, and a switch in the motor-circuit which is operated by said means, substantially as described.

2. The combination with series-wound field-magnets, of a progressively-wound armature, a commutator for said progressive windings, closed windings on the armature, a ring on the commutator for short-circuiting the greater number of progressive windings of the armature; a switch in the armature-circuit, and a lever for operating said ring and switch, substantially as described.

3. In an electric motor, the combination with the armature, of open windings thereon, a commutator for said windings, brushes which are yieldingly held against the commutator, means for electrically connecting said brushes when they are relieved of pressure, a short-circuiting ring adapted to contact with the commutator-segments, means for forcing said ring into and out of contact with the commutator-segments, and, at the same time, relieve and restore the pressure on the brushes, and a handle for operating said mechanism; substantially as described.

4. In an electric motor, the combination with an armature consisting of a laminated core having polar projections extending from its periphery, closed windings consisting of heavy strands arranged at the bottoms of the spaces between said polar projections, and open windings arranged between the polar projections and upon the closed windings; substantially as described.

5. In a field-magnet for alternating-current motors, the combination with a laminated body of polar projections extending therefrom, coils arranged on single polar projections, coils arranged on three of said polar projections, in which groups of three, the polar projections containing the coils first mentioned are included, both coils of a magnet being wound in the same direction; substantially as described.

6. In a field-magnet for alternating-current motors, the combination with a laminated body of polar projections extending therefrom, single coils arranged on certain of said polar projections and equidistantly disposed around said field-magnet, coils which are arranged on groups of polar projections, in which groups the polar projections containing the single coils are included, said polar projections containing single coils occupying central positions in the groups, the coils in each group being wound in the same direction, so as to produce magnetic lines of force of opposite polarity, in alternate groups, said magnetism being most intense at the center of the groups, and a neutral or unwound polar projection between each group; substantially as described.

7. In an electric motor, the combination with the poles of the field-magnet whose magnetism is most intense at the center, alternate poles being of opposite polarity, of an armature, a closed winding on the armature, an open winding on the armature, a switch in the motor-circuit, and means for short-circuiting the open windings of the armature, said means also controlling the switch in the motor-circuit; substantially as described.

8. In an electric motor, the combination with the field-magnet, of an armature, open and closed windings on the armature, a commutator for the open windings, brushes yieldingly held against the commutator-segments, a ring adapted to contact with the commutator-segments and short-circuit the open windings, a switch in the motor-circuit, and a lever for operating said switch and short-circuiting ring, said lever being so arranged that it will throw the switch before it moves the ring into contact with the commutator-segments; substantially as described.

9. In an electric motor, the combination with the field-magnet, of an armature, open and closed windings on the armature, a commutator for the open windings, brushes yieldingly held against the commutator-segments, a ring adapted to contact with the commutator-segments and short-circuit the open windings, a switch in the motor-circuit, a yoke for moving the short-circuiting ring, said yoke also electrically connecting the brushes and relieving them of pressure when in certain of its positions, a shaft on which said yoke is loosely mounted, a rock-arm fixed on the shaft for operating the switch, and a lever fixed on the shaft, which lever is adapted to engage and operate the yoke in certain of its positions; substantially as described.

10. In an electric motor, the combination with the field-magnet, of an armature, open and closed windings on the armature, a commutator for the open windings, brushes for the commutator, a ring adapted to contact with, and short-circuit, the segments of the commutator, a yoke provided with rollers located some distance apart but in the path of said ring, for moving the ring, and a lever for operating the yoke; substantially as described.

11. The combination with a commutator, of a short-circuiting band which is adapted to contact with the commutator-segments, a yoke for operating said band, and a lever for operating said yoke, said lever being so arranged that lost motion is permitted between it and the yoke; substantially as described.

12. The combination with a commutator, of a short-circuiting band which is adapted to contact with the commutator-segments, brushes for said commutator, a yoke for sliding said band into and out of contact with the segments, spring-pressed pieces which engage the brushes and force them into contact with the commutator, and insulated pieces which are carried by the yoke and electrically connected together, for engaging said spring-pressed pieces to relieve the brushes of pressure when the commutator-segments are short-circuited; substantially as described.

13. The combination with a commutator, of a short-circuiting band which is adapted to contact with the commutator-segments, a yoke which is pivoted in juxtaposition to the commutator, and rollers on the yoke for engaging and sliding the band; said rollers being so arranged that the yoke has an initial movement before the band is moved, substantially as described.

14. The combination with a commutator, of a short-circuiting ring which is adapted to contact with the commutator-segments, a swinging yoke provided with rollers in front of, and behind said ring, a lever formed with a recess, mounted on the yoke-shaft, and a projection on the yoke which extends into said recess; substantially as described.

15. The combination with a commutator, of a short-circuiting ring which is adapted to contact with the commutator-segments, a yoke for sliding said ring, a lever for operating the yoke, and a yielding buffer against which the yoke is adapted to strike in one of its positions; substantially as described.

16. The combination with a commutator, of a short-circuiting ring which is adapted to contact with the commutator-segments, a yoke, rollers on said yoke which are adapted to slide said ring into and out of contact with the commutator-segments, a lever for operating said yoke, between which lever and yoke lost motion is permitted, and a yielding buffer which is placed in line with the yoke to relieve the ring of the yoke-rollers while the yoke is in one of its positions; substantially as described.

17. The combination with a commutator, of commutator-brushes, brush-holders in which said brushes are slidingly mounted, spring-pressed pieces which normally force the brushes against the commutator, cam-faces on said spring-pressed pieces, a pivoted yoke, and electrically-connected caps on the ends of the yoke for contacting with said cam-faces and relieving the brushes of pressure, at the same time electrically connecting said spring-pressed pieces; substantially as described.

18. The combination with a commutator, of the brushes and brush-holders, spring-pressed pieces which normally force the brushes against the commutator, and a swinging yoke which is adapted to come in contact with said pieces, relieve the brushes of pressure, and electrically connect the brushes; substantially as described.

19. The combination with a commutator, of the brushes and brush-holders, spring-pressed pieces which normally force the brushes against the commutator, and a swinging yoke having electrically-connected caps, on its ends, said caps being insulated from the yoke, and said caps being adapted to come in contact with the pieces which force the brushes against the commutator, when the yoke is swung; substantially as described.

20. The combination with a commutator, of brushes and brush-holders, spring-pressed pieces I for forcing the brushes into contact with the commutator, said pieces I being formed with cam-faces on one of their edges, and a yoke which is adapted to contact with said cam-faces and relieve the brushes of their pressure; substantially as described.

21. In an electric motor, the combination with the field-magnets and armature, of a commutator and its brushes, a short-circuiting ring which is adapted to contact with the commutator-segments, a yoke for operating said ring, and a controlling-switch for the motor which is operated by the yoke-shaft; substantially as described.

22. In an electric motor, the combination with the field-magnets and armature, of a commutator and its brushes, a short-circuiting ring which is adapted to contact with the commutator-segments, a yoke for operating said ring, a shaft upon which said yoke is loosely mounted, a lever which is fixed to the shaft for operating the yoke, and an arm of insulation material which is fixed to the shaft for operating a controlling-switch for the motor; substantially as described.

23. In an electric motor, the combination with the field-magnets and armature, of a commutator and its brushes, a short-circuiting ring which is adapted to contact with the commutator-segments, a yoke for operating said ring, a shaft upon which said yoke is loosely mounted, a lever which is fixed to the shaft for operating the yoke, an arm of insulation material fixed to the shaft, and telescoping sections which are operated by said arm, said sections operating a controlling-switch for the motor; substantially as described.

24. In an electric motor, the combination with the field-magnets and armature, of a commutator and its brushes, a short-circuiting ring which is adapted to contact with the commutator-segments, a yoke for operating said ring, a shaft upon which said yoke is loosely mounted, a lever which is fixed to the shaft for operating the yoke, an insulation-arm mounted on the shaft, and a switch-operating mechanism comprising telescoping sections Q' and Q'' with an interposing spring q, and the switch-blade; substantially as described.

25. The combination with a commutator, of a short-circuiting band therefor, a yoke for operating said band, a rock-arm mounted on the yoke-shaft, telescoping sections mounted on said arm, a spring interposed between said sections, and a motor-switch which is operated by said telescoping sections; substantially as described.

26. In an electric motor, the combination with an armature, having open windings, and closed windings, a commutator for the open windings, brushes for the commutator, and means for short-circuiting the commutator, said means also electrically connecting the brushes when the commutator is short-circuited.

27. An electric motor which is designed to be run essentially as an induction-motor, the same comprising a starting device including the field-armature, a commutator, and brushes, which are thrown into operative relation by the movement of a lever, a continuous movement of the lever in the same direction short-circuiting the armature, whereby the motor runs as an induction-motor.

28. An electric motor which is designed to run essentially as an induction-motor, the same comprising a starting device including the field, an armature having open and closed windings, and a commutator and brushes for the open windings which are thrown into operative relation by the movement of a lever, whereby the motor runs as a series motor, a continued movement of the lever in the same direction short-circuiting the open windings of the armature, and electrically connecting the brushes, whereby the motor runs as an induction-motor, utilizing both windings of the armature, which prevents the motor from "running away;" substantially as described.

29. The combination with an insulation-slab of adjustable blocks R' and T' arranged thereon, a switch-blade pivoted to one of said blocks and adapted to engage the other, a piece R pivoted on the pivot-pin of said blade and which is adapted to operatively engage the blade in certain of its positions, a spring mounted on said piece R and connected at its other end to the blade, and a perforated projection extending from piece R to which is adjustably connected the operating means; substantially as described.

In testimony whereof I hereunto affix my signature, in presence of two witnesses, this 12th day of November, 1895.

EDWIN S. PILLSBURY.

Witnesses:
F. R. CORNWALL,
HUGH K. WAGNER.